(No Model.)

J. J. NECKER & C. GIFFORD.
RIBBON SPOOL.

No. 383,141. Patented May 22, 1888.

Witnesses.
F. J. Barrett,
H. M. Sturgeon.

Inventors.
John J. Necker,
Cyrus Gifford,
By J. M. Sturgeon,
Atty.

United States Patent Office.

JOHN J. NECKER AND CYRUS GIFFORD, OF NORTH EAST, PENNSYLVANIA, ASSIGNORS OF ONE-THIRD TO JOHN F. OLDACH, OF SAME PLACE.

RIBBON-SPOOL.

SPECIFICATION forming part of Letters Patent No. 383,141, dated May 22, 1888.

Application filed January 21, 1888. Serial No. 261,556. (No model.)

*To all whom it may concern:*

Be it known that we, JOHN J. NECKER and CYRUS GIFFORD, citizens of the United States, residing at North East, in the county of Erie and State of Pennsylvania, have invented certain new and useful Improvements in Ribbon Registering and Retaining Spools; and we do hereby declare the following to be a full, clear, and exact description of the invention, such as will enable others skilled in the art to which it appertains to make and use the same, reference being had to the accompanying drawings, and to the letters of reference marked thereon, forming part of this specification.

Our invention consists in the improvements in ribbon registering and retaining spools hereinafter set forth, and explained in the specification and claims, and illustrated in the accompanying drawings, in which—

Figure 1:
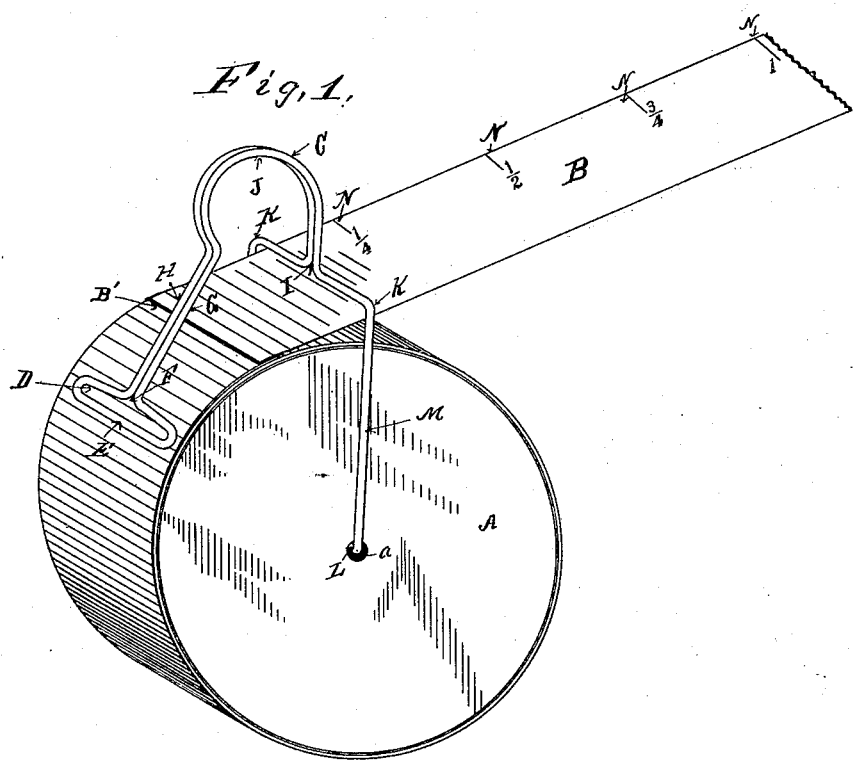
Figure 2:
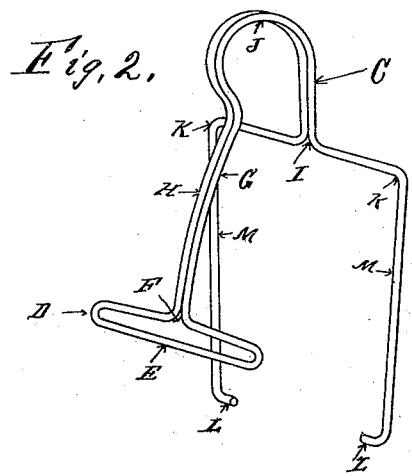

Figure 1 is a perspective view of our improvement. Fig. 2 is a perspective view of the ribbon-retaining device of our improvement detached from the ribbon-spool.

Like letters refer to like parts in all the figures.

The principal features and objects of our invention are, first, to construct and combine a ribbon-measuring scale or register with a ribbon-spool in such shape that as the ribbon is measured and cut off the scale or register will at all times show the amount of ribbon remaining on the spool; second, to construct and combine a spring-clamp with a ribbon-spool in such shape that it will automatically retain the free end of the ribbon remaining on the spool without interfering with its being unrolled or rolled up in the ordinary manner.

Other features will appear hereinafter in the specification and claims.

In the construction of our device shown, A is a ribbon-spool of usual and ordinary construction. In the axis of this spool we make small openings *a*, adapted to receive the ends L of the ribbon-retainer C, Fig. 2. The ribbon-retainer C is preferably constructed of light spring-wire, having a loop, D, bent in the center thereof, the outside, E, of this loop being preferably straight and of sufficient length to reach nearly or quite across the face of the spool A, so as to form a foot adapted to press upon the outside surface of ribbon wound upon the spool A. At the point F, where the wires meet at the back side of the loop D, the wire is bent so as to stand substantially at right angles to the front side, E, of the loop D, from whence wires G and H are carried side by side to the point I and bent so as to form the curve J. At the point I the wires are bent apart laterally, and at the points K the wires are bent downward, so as to span the spool A. The ends L L are then bent inward, so as to form axes adapted to enter the holes *a* in the center of the spool A.

The length of the wires H and G and the shape of the curve J are such that when the retainer C is placed upon the spool A the spring of the curve J compresses the foot E of the loop D firmly upon the outside of the ribbon rolled upon the spool A, so that when the free end of the ribbon and its register-paper B are seized in one hand and the spool held by taking the curved parts J of the ribbon-retainer C in the other, the ribbon may be freely unrolled, the spool A rotating upon the bearings L L of the retainer C, and when it is desired to roll the ribbon and register-paper B upon the spool the portions M M of the retainer C on each side of the spool A operate as guides, so that the ribbon and register-paper B will roll up straight.

We have shown a convenient form of ribbon-retainer, but can make the ribbon-retainer in other shapes and accomplish thereby the same or like results.

In rolling ribbon upon the spool A ordinarily a strip of paper of the same width as the ribbon is wound upon the spool with it to preserve the ribbon and keep it smooth upon the spool.

Our registering device consists of printing upon one edge of this strip of paper figures, N, indicating the number of yards or parts of yards of ribbon wound upon the spool. In use the end B' of the strip of paper B, having the first yard-marks N thereon, is secured to the spool A with the end of the ribbon to be wound thereon. The ribbon and the strip of paper are then rolled up together on the spool A until the spool A is filled. The holder C, Fig. 2, is then placed upon the spool A. Now as the ribbon and paper are unrolled and cut off the number N at the free end of the paper B remaining on the spool A will at all times show by inspection the amount of ribbon remaining on the spool A without the necessity of unrolling and measuring it.

Having thus described our invention, what we claim as new, and desire to secure by Letters Patent of the United States, is—

1. The combination, with a ribbon-spool, of the clip C, provided with vertical wire arms having the spool-pivots L, the bow-spring portion J, formed by the conjunction and continuation of the said arms, and the bow forming a continuation of the said spring portion and having the straight wire E, for pressing crosswise upon the ribbon, substantially as set forth.

2. The combination, with a ribbon-spool, of the measuring-strip B, wound upon the spool with the ribbon, and the clip C, provided with vertical wire arms having the spool-pivots L, the bow spring portion J, formed by the conjunction and continuation of the said arms, and the bow forming a continuation of the said spring portion and having the straight wire E, for pressing crosswise upon the ribbon, substantially as set forth.

In testimony whereof we affix our signatures in presence of two witnesses.

JOHN J. NECKER.
CYRUS GIFFORD.

Witnesses:
JOHN F. OLDACH,
H. J. CURTZE.